H. B. ROSS.
MECHANISM FOR TRANSMITTING MOTION.
APPLICATION FILED MAY 23, 1910.
989,427.
Patented Apr. 11, 1911.
3 SHEETS—SHEET 1.
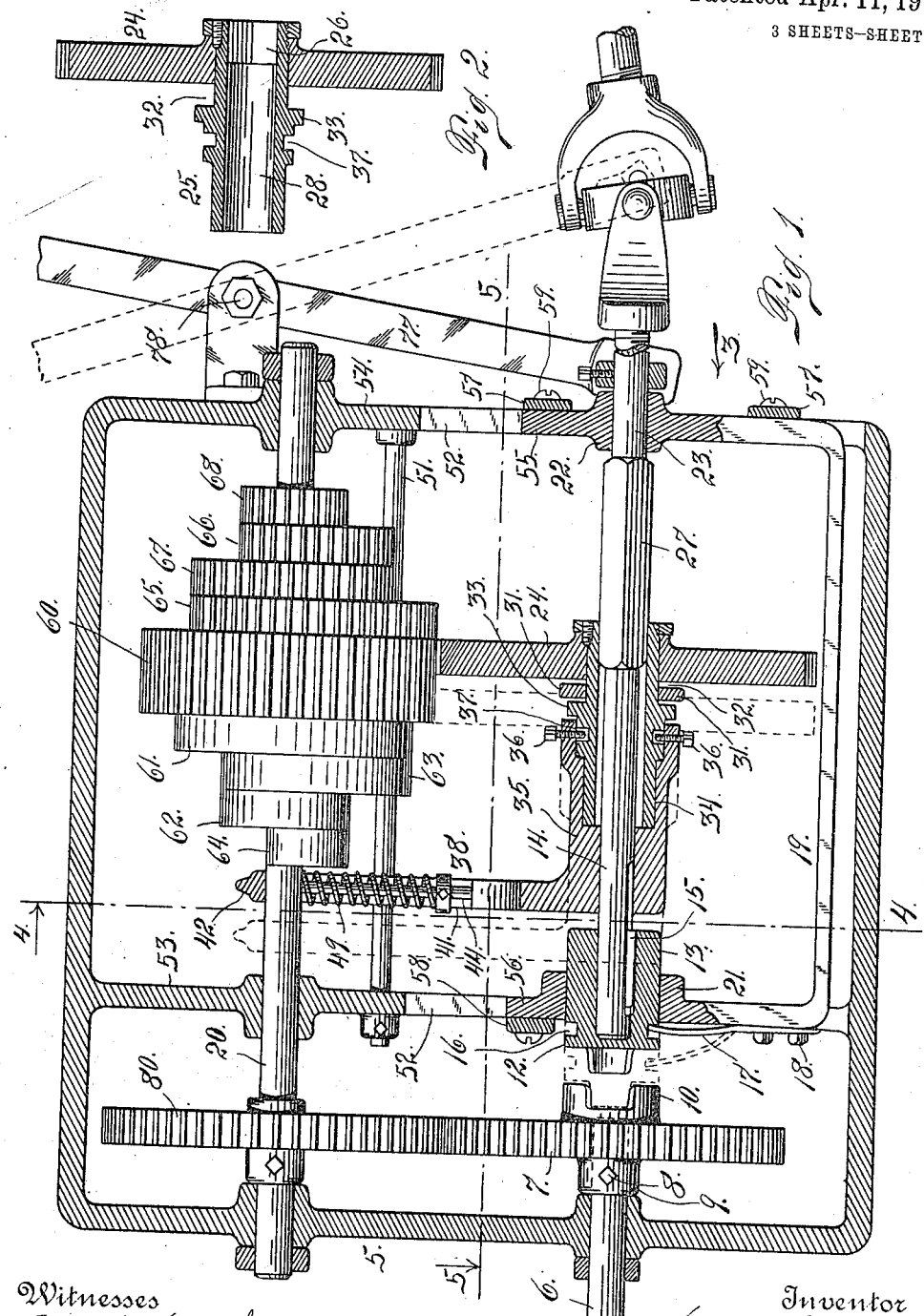
Witnesses
Otto E. Hoddick.
C. H. Roessner.
Inventor
Harry B. Ross.
By 
Attorney

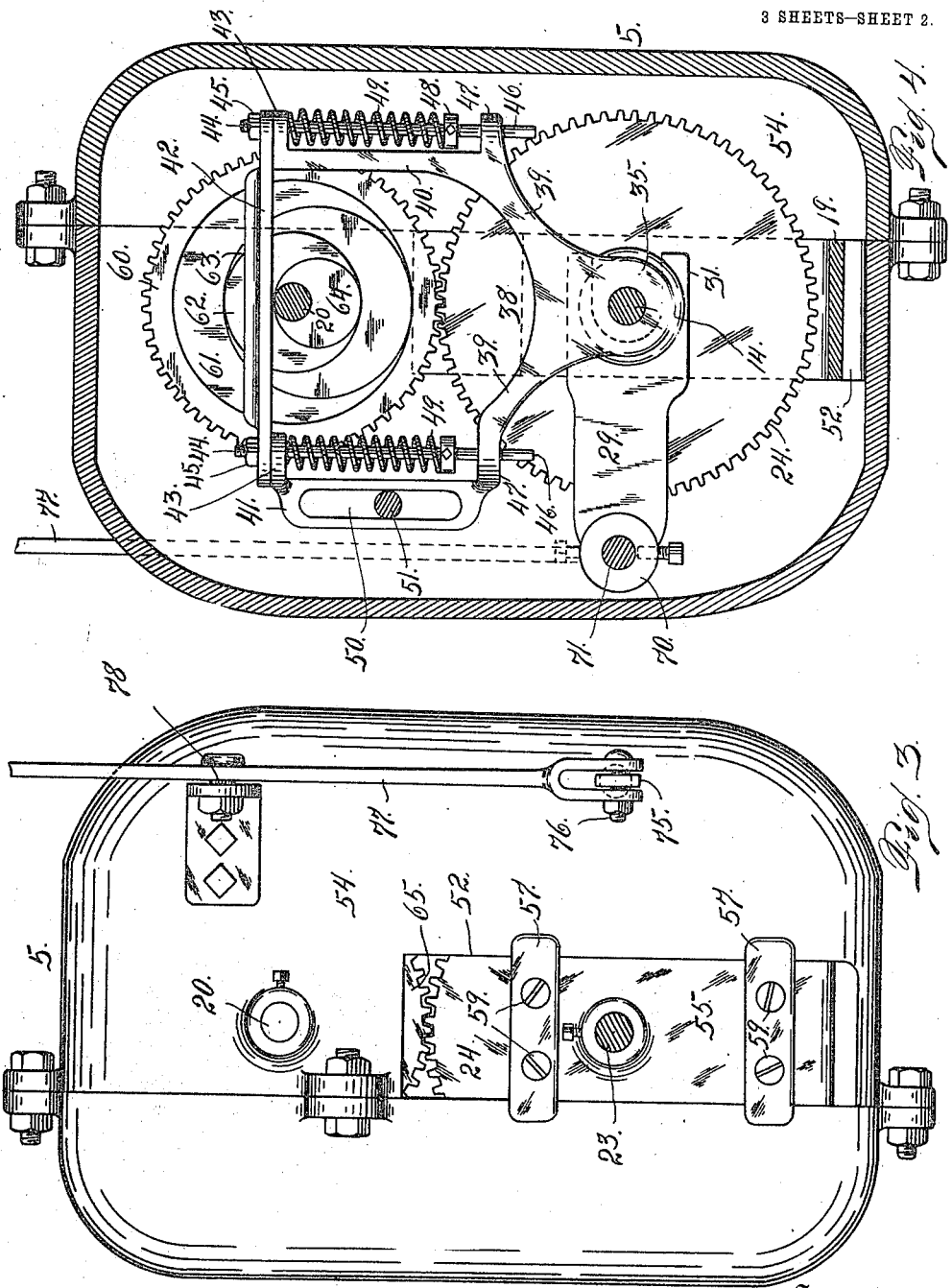

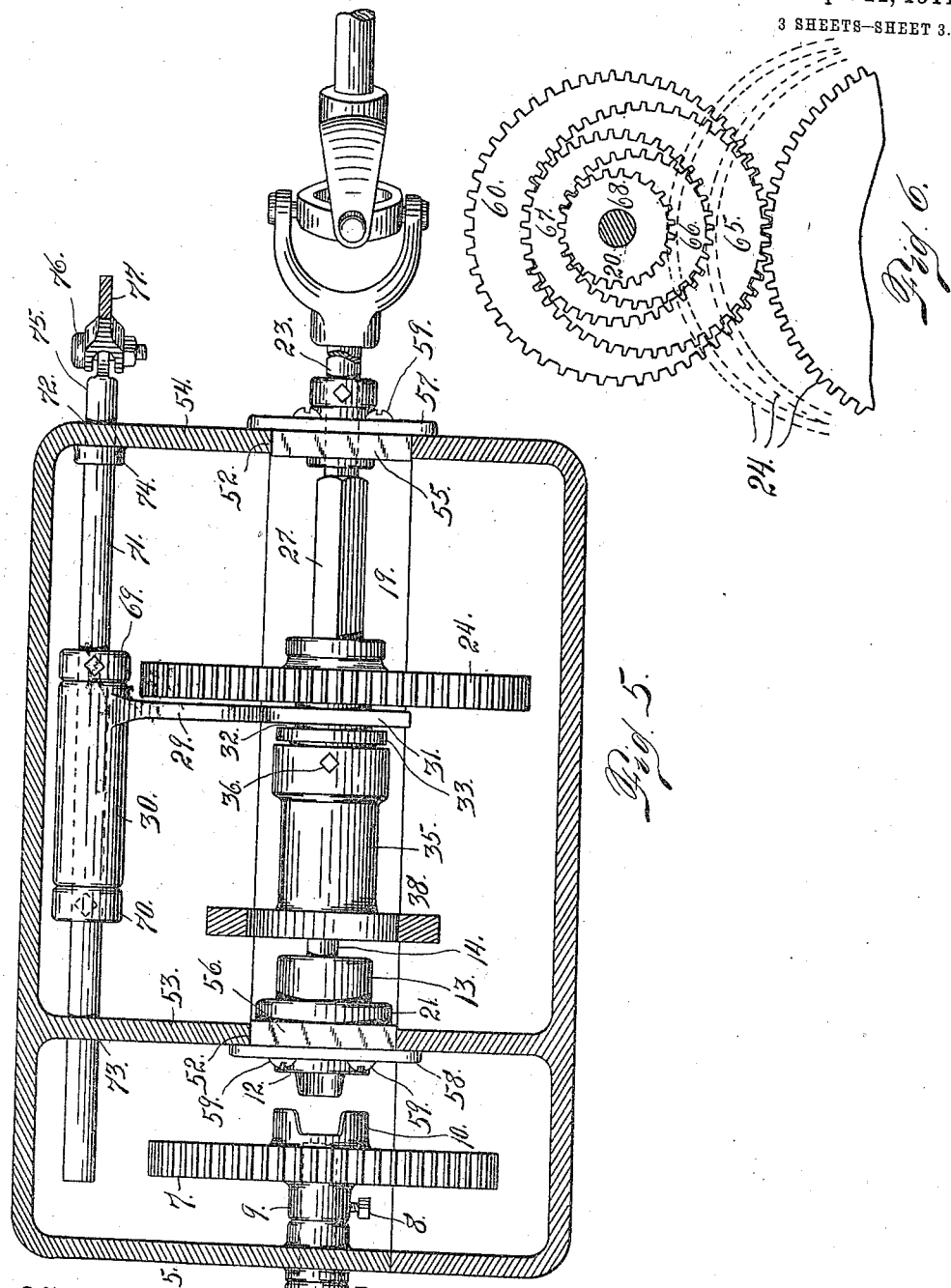

UNITED STATES PATENT OFFICE.

HARRY BEAUREGARD ROSS, OF DENVER, COLORADO.

MECHANISM FOR TRANSMITTING MOTION.

989,427.

Specification of Letters Patent.   Patented Apr. 11, 1911.

Application filed May 23, 1910.   Serial No. 562,819.   REISSUED

*To all whom it may concern:*

Be it known that I, HARRY BEAUREGARD Ross, a citizen of the United States, residing in the city and county of Denver and State of Colorado, have invented certain new and useful Improvements in Mechanism for Transmitting Motion; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in mechanism for transmitting motion, being more especially intended for use on automobiles or self-propelled vehicles, its object being to change the speed of the vehicle at will and without subjecting the transmission mechanism or other parts of the structure to injury by concussion or jar incident to the variation in speed.

In my improved construction provision is made for a direct connection between the driving shaft and the driven shaft when it is desired to run the vehicle at the maximum speed of the driving shaft. It is preferred, however, to construct the mechanism so that the driven shaft is normally disconnected from the driving shaft but arranged to be manually connected therewith.

Interposed between the driving shaft and the driven shaft, is a countershaft upon which is mounted a number of concentric and eccentric gears alternately arranged and adapted to mesh with a gear slidably mounted on the driven shaft, the latter being connected with the countershaft by means of a yoke which coöperates with eccentric cams, and concentric collars alternately arranged but in the reverse order from the arrangement of the eccentric and concentric gears, the eccentric cams serving, through the instrumentality of the yoke, to move the driven shaft and its gear, toward the countershaft during the operation of changing from low to high speed, whereby the gear on the driven shaft must be successively brought into engagement with gears of decreasing diameter.

In my improved construction I have arranged upon the countershaft a main or master gear which is adapted to mesh with the gear upon the driven shaft when the latter is interlocked with the driving shaft, or when the driving and driven shafts are in alinement, whether interlocked or not. On one side of this master gear, the eccentric and concentric gears are arranged, while on the opposite side the eccentric and concentric collars are arranged, all of the gears and collars being fast on the countershaft.

Having briefly outlined my improved construction, I will proceed to describe the same in detail, reference being made to the accompanying drawing in which is illustrated an embodiment thereof.

In this drawing: Figure 1 is a vertical section taken through my improved transmission gear mechanism, the parts within being shown partly in elevation and partly in section. Fig. 2 is a section taken through the driven gear and its sleeve, shown in detail. Fig. 3 is an end elevation of the gear case, showing the driving shaft in cross section. Fig. 4 is a vertical cross section taken on the line 4—4, Fig. 1. Fig. 5 is a horizontal section taken on the line 5—5, looking downwardly. Fig. 6 is an end view of the gears, the driven gear being shown in its three possible positions, the one in full lines and the other two in dotted lines.

The same reference characters indicate the same parts in all the views.

Let the numeral 5 designate the gear case in which is journaled one extremity of the driving shaft 6, the said shaft protruding into the gear case and equipped with a gear 7 secured to the shaft by a set bolt 8 passing through a collar 9. On the opposite side of the gear 7 is a female clutch member 10 adapted to interlock with a counterpart male member 12 carried by a sleeve 13 splined upon one extremity of the driven shaft 14, whereby it is caused to rotate with the shaft but has sufficient sliding movement to cause it to interlock with the clutch member 10 without breaking its rotary relation with the driven shaft. The splined connection of the shaft 14 with the clutch sleeve 13 is indicated at 15. This clutch sleeve is also provided with a circumferential groove 16 into which extends one extremity of a leaf spring 17 secured by means of bolts 18 to a vertically movable frame 19 arranged to carry the driven shaft as it moves toward and away from the countershaft 20 during the operation of changing the speed of the machine. This movable frame 19 is reinforced as shown at 21 to form a bearing for the clutch sleeve 13; and also at 22 to form a suitable bearing for a portion 23 of the driven shaft.

Mounted on the driven shaft between the bearing extremities of the frame 19, is a gear 24 made fast to a sleeve 25 having a portion 26 angular in cross section to receive and fit a portion 27 of the driven shaft. The remainder of the interior of the sleeve 25 is cylindrical as shown at 28, so that by shifting the gear 24 and its sleeve to the dotted line position in Fig. 1, the clutch members 10 and 12 are caused to interlock. The gear 24 is loose on the driven shaft, motion being communicated directly to the latter from the driving shaft by virtue of the interlocking of the clutch members.

An arm 29 connected with a loose sleeve 30, is forked as shown at 31 to straddle the sleeve 25 of the gear 24, this forked portion of the arm engaging a groove 32 between the gear and a collar 33 with which the sleeve 25 is provided. This sleeve 25 enters a counterpart-bore 34 formed in one extremity of a sleeve 35, the sleeves 25 and 35 being connected to move longitudinally of the shaft 24 in unison, by means of bolts 36 threaded in the sleeve 35 and entering a circumferential groove 37 formed in the sleeve 25, thus allowing the sleeve 25 to turn with its gear 24 without rotating the sleeve 35. This sleeve 35, as illustrated in the drawing, is formed integral with a yoke 38 which extends outwardly in opposite directions as shown at 39. From the outer extremities of the parts 39 parallel arms 40 and 41, extend upwardly, their upper extremities being connected by a cross bar 42, whose extremities are perforated to register with perforations formed in ears 43 projecting outwardly from and integral with the arms 40 and 41. The upper portions of rods 44 pass through the registering openings in the cross bar and the lugs 43, the said rods being threaded to receive nuts 45. The lower portions 46 of the rods 44 slide freely in openings formed in lugs 47 located at the outer extremities of the yoke-arms 39. Mounted on these rods and interposed between the lugs 43 and stop-collars 48 adjustably mounted on the rods, are coiled springs 49 which are sufficiently rigid to cause the bar 42 to carry the yoke and driven shaft therewith during the operation of the mechanism or as the cross bar is actuated by the eccentric collars during the adjustment of the mechanism for reducing the speed of the driven shaft, as hereinafter explained in detail. As illustrated in the drawing, the upwardly projecting member 41 of the yoke is vertically slotted as shown at 50 to receive a stationary guide-bar 51 carried by the casing.

The frame 19 is vertically movable in elongated openings 52 formed in one end 54 of the gear case and a partition or web 53 interposed between the extremities of the said case. The slidable members 55 and 56 of the vertically movable frame are equipped with plates 57 and 58, the said plates being secured by screws 59. These plates serve to maintain the parts 55 and 56 in operative engagement with the openings of the case, preventing any endwise movement in the direction of the axis of the driven shaft.

Mounted on and made fast to the countershaft 20 is a master gear 60 whose cogged periphery is somewhat more than twice the width of the corresponding periphery of the gear 24 so that the master gear is always in mesh with the gear 24 whether the driven shaft is actuated directly from the driving shaft, as when the parts are in the dotted line position (see Fig. 1), or indirectly from the countershaft when the clutch members 10 and 12 are disconnected, as shown in full lines in Fig. 1.

On one side of the master gear, being that toward the yoke 38, a number of concentric and eccentric collars are located, the concentric collars being designated 61 and 62, and the eccentric collars 63 and 64. The eccentric collar 64 has a maximum radius equal to that of the concentric collar 62, whereby these two collars are tangential to a common plane at one point; while the eccentric collar 63 has a maximum radius equal to the radius of the concentric collar 61 and a minimum radius equal to that of the concentric collar 62, whereby the collars 62 and 63 are tangential to the same plane at a common point, while the collars 61 and 63 are also tangential to a given plane at a common point. On the opposite side of the master gear is located a number of eccentric and concentric gears equal to the collars just described, the eccentric gears being designated 65 and 66 and the concentric gears 67 and 68. The eccentric gear 65 which is contiguous to the master gear has a maximum radius equal to that of the master gear and a minimum radius equal to that of the concentric gear 67 to which it is also contiguous, the gear 61 being interposed between the two gears 60 and 67. Hence the gears 60 and 65 are tangential to a given plane at a single common point; while the gears 65 and 67 are also tangential to a common plane at a single point. Furthermore, the eccentric gear 66 has a maximum radius equal to the radius of the concentric gear 67 and a minimum radius equal to that of the concentric gear 68.

The gear 66 is contiguous with the gears 67 and 68, being interposed between them; and by virtue of the relation heretofore described, it is evident that the gears 66 and 67 have a common point tangential to a given plane, while this is also true of the gears 66 and 68, the two said points, however, being located diametrically opposite.

Referring again to the forked arm 29 for shifting the gear 24 on the driven shaft, attention is called to the fact that the sleeve 30 upon which the arm 29 is fast, is interposed between two collars 69 and 70, the said collars being secured to a shaft 71 which is longitudinally slidable in the gear case, the latter having openings 72 and 73 for the purpose. The case is reinforced as shown at 74 around the openings 72, to give the shaft 71 a better bearing.

The shaft 71 protrudes beyond the gear case as shown at 75 and its protruding extremity is pivotally connected, as shown at 76, with the lower extremity of an operating lever 77 fulcrumed at 78 above its connection with the shaft. It is evident that by manipulating this lever the forked arm 29 may be moved back and forth whereby a corresponding movement is imparted to the gear 24, its sleeve 25 and the yoke 38.

If we assume that the gear 24 and the clutch member 12 are in the position indicated by dotted lines in Fig. 1, whereby the driving and driven shafts are directly interlocked, the gear 24 will be loose on the driven shaft and while it will rotate, since it is still in mesh with the master gear 60, it performs no function in the transmission of speed or power, since the latter is directly transmitted, the driven shaft in this event having the same speed as the driving shaft. Now if it is desired to reduce this speed, the clutch member 12 will be disconnected from its companion member 10, by the action of the spring 17, which is intended to perform this function. In order that the rest of the mechanism may be in harmony with the arrangement just explained, it will of course be necessary to forcibly maintain the clutch member 12 in engagement with its companion member 10 when it is desired that the maximum speed of the driving shaft be transmitted to the driven shaft. This, however, is a detail of construction which it is not thought necessary to illustrate, since it could be accomplished by any ordinary provision for retaining the operating lever 77 in the proper position of adjustment. Now, assuming that the clutch members are disconnected, and that the gear 24 is in the position shown by full lines in Fig. 1, if the driving shaft is in motion, speed will be transmitted to the driven shaft through the instrumentality of two meshing gears 7 and 80, the one being on the driven shaft and the other on the countershaft; together with the master gear 60 as the two gears 7 and 80 are of the same diameter, the speed of the driving and counter shafts would be the same, but as the master gear is of less diameter than that of the gear 24, the speed of the driven shaft will be somewhat less than that of the driving shaft. Again, if it is desired to further reduce the speed of the driven shaft, the gear 24, together with its sleeve 25 and the yoke 38, may be shifted by the use of the lever 77, whereby the gear 24 is caused to mesh with the eccentric gear 65, in which event the cross bar 42 of the yoke will engage the eccentric collar 64, since the minimum radius of this eccentric gear, is the radius of the countershaft. The cross bar 42, however, will be prevented from further movement by virtue of its engagement with the eccentric collar 62, until the countershaft has rotated sufficiently to bring the maximum line of eccentricity of the collar 64 uppermost. Hence, the gear 24 will be prevented from moving out of mesh with the eccentric gear 65 during the same time or until the countershaft is rotated sufficiently to bring the portion of the eccentric gear 65 nearest the center of the shaft into mesh with the gear 24. Now as the countershaft continues to rotate, the eccentric collar 64 acting on the cross bar 42 of the yoke, will draw the driven shaft toward the countershaft, and when the part of the collar farthest from the axis of the countershaft is in engagement with the cross bar of the yoke, the said bar will be in position to move into engagement with the concentric collar 62, whereby the gear 24 is allowed to engage the concentric gear 67, the one gear slipping into mesh with the other at the point where both gears have the same radius, being the minimum radius of the eccentric gear.

To further reduce the speed of the driven shaft, the lever 77 may be actuated to shift the gear 24 out of mesh with the concentric gear 67 and into mesh with the eccentric gear 66, at the point where these two gears are tangential to the same plane, but the gear 24 cannot be shifted until this relation between the gears 66 and 67 occurs, since in the meantime the eccentric collar 63 will stop the cross bar 42 from movement, until the portion of the collar 63 nearest the center of the countershaft is uppermost, in which event it lies in the same plane with the lower surface of the cross bar 42 which is in engagement with the concentric collar 62. It will be noted that the gears and collars are so arranged on the shaft 20 that when the portions of the collars lying in the same plane are uppermost, whereby the cross bar is allowed to slide from one to the other, the corresponding portions of the gears are lowermost, whereby the gear 24 is allowed to slide freely from one to the other. Now as soon as the point of minimum eccentricity of the gear 63 is uppermost, the yoke 42 will slide freely in response to the movement of the lever 77 from the concentric collar 62 to the eccentric collar 63. The bar 42, however, cannot move any farther until it has been lifted by the eccentric collar 63 to its maximum height, and when so lifted, its lower surface will lie in the same plane as the uppermost portion of the concentric collar 61, but as soon as this occurs the point of minimum eccentricity of the gear 66 will be lowermost and consequently in the same plane with the lowest part of the concentric gear 68, thus allowing the gear 24 to slip from the eccentric gear 66 into mesh with the concentric gear 68, the movement of the gear 64 from the meshing relation of the one gear into that of the other gear being in the same plane. It will be understood that after reducing the speed of the driven shaft to the minimum, it may be gradually changed back to the maximum by reversing the movement of the lever 77 and the movement of the other parts of the mechanism, all of which operations will be readily understood without detailed explanation.

By reason of the fact that I employ the collars 61 and 62, 63 and 64, it becomes practicable to properly space the shafts 14 and 20, to cause the gear 24 on the driven shaft and the gears on the counter shaft to properly mesh with each other, that is to say, so that the pitch lines of the two meshing gears shall be exactly tangential to each other. This is an important feature in a construction of this class, since it completely prevents any grinding of the gears and undue wear thereon. It also causes the gears to run noiselessly.

Having thus described my invention what I claim is:

1. In means for transmitting motion, the combination of a driving shaft, a driven shaft, an interposed countershaft, a constant speed gearing connection between the driving and counter shafts, and a changeable speed-gearing connection between the countershaft and the driven shaft, consisting of a number of eccentric and concentric gears alternately arranged on the counter-shaft, and a concentric gear on the driven shaft, substantially as described.

2. In means for transmitting motion, the combination of a driving shaft, a driven shaft, an interposed countershaft, a direct clutch-connection between the driving and driven shafts, a gearing connection between the driving and counter-shafts, and a changeable speed gearing connection between the counter and driven shafts, consisting of alternately arranged eccentric and concentric gears mounted on the countershaft, and a movably mounted and coöperating gear mounted on the driven shaft.

3. In means for transmitting motion, the combination of a driving shaft, a driven shaft, and an interposed countershaft, the driving and driven shafts being in alinement, clutch mechanism for directly connecting the driving and driven shafts for imparting the maximum speed to the driven shaft, a gearing connection between the driving shaft and the countershaft, and a changeable speed gearing connection between the counter and driven shafts, consisting of a plurality of eccentric and concentric gears alternately arranged on the counter-shaft, and a concentric gear on the driven shaft.

4. In means for transmitting motion, the combination with a driving shaft, a driven shaft, an interposed countershaft, the driving and driven shafts being in alinement, clutch-mechanism directly connecting the driving and driven shafts, to impart to the latter the maximum speed, a gearing connection between the driving and counter shafts, changeable speed-gearing mechanism consisting of alternately arranged concentric and eccentric gears mounted on the countershaft, and a coöperating-gear mounted on the driven shaft.

5. In means for transmitting motion, the combination of a driving shaft, a driven shaft and a counter shaft, the driving and driven shafts being in axial alinement, a detachable clutch-connection between the driving and driven shafts for maximum speed, a constant gearing connection between the driving and counter shafts, and a changeable speed gearing connection between the counter and driven shafts, consisting of a number of eccentric and concentric gears, alternately arranged on the countershaft and a concentric coöperating gear on the driven shaft.

6. The combination of a driving shaft, a driven shaft, an interposed counter shaft, a constant speed-gearing connection between the driving and counter shafts, and a changeable speed-gearing connection between the counter and driving shafts, including a number of eccentric and concentric gears alternately arranged on the countershaft, and a concentric gear on the driven shaft, the latter being movable toward and away from the counter shaft, and an operative connection between the driven and counter shafts.

7. The combination of a driving shaft, a driven shaft, an interposed counter shaft, a constant speed-gearing connection between the driving and counter shafts, and a changeable speed-gearing connection between the counter and driven shafts, including a number of eccentric and concentric gears alternately arranged on the counter shaft, and a concentric gear on the driven shaft, the latter being movable toward and away from the counter shaft, a yoke connecting the driven and counter shafts and having a bar normally engaging the counter shaft, the yoke and the gear on the driven shaft being slidable on the driven shaft, eccentric and concentric collars also of varying diameters arranged alternately on the counter shaft for regulating the travel of the gear in a longitudinal direction on the driven shaft.

8. The combination of a driving shaft, a driven shaft, an interposed counter shaft, a constant speed-gearing connection between the driving and counter shafts, and a changeable speed-gearing connection between the counter and driven shafts, including a number of eccentric and concentric gears alternately arranged on the counter shaft, and a concentric gear slidably mounted on the driven shaft, whereby it may be brought sucessively into mesh with all the gears of the counter shaft.

9. The combination of a driving shaft, a driven shaft, an interposed counter shaft, a constant speed-gearing connection between the driving and counter shafts, and a changeable speed-gearing connection between the counter and driven shafts, including a number of eccentric and concentric gears, alternately arranged on the countershaft, the eccentric gear between any two concentric gears having its maximum radius equal to the radius of the concentric gear on one side, while its minimum radius is equal to that of the concentric gear on the other side, and a concentric gear on the driven shaft, the latter being movable toward and away from the counter shaft, and the gear on the driven shaft being slidably mounted, whereby it may be brought successively into mesh with all the gears on the countershaft.

10. The combination of a driving shaft, a driven shaft, an interposed counter shaft, a number of gears of varying diameter fast on the counter shaft, the said gears comprising concentric gears and interposed eccentric gears, the maximum radius of an eccentric gear being the same as the radius of the concentric gear on one side, while the minimum radius is the same as the radius of the concentric gear on the other side, the counter shaft also being equipped with a number of eccentric and concentric collars, corresponding with the number of gears, a yoke connecting the driven and counter shafts and having a bar engaging the counter shaft, the concentric collars being interposed between the eccentric collars, the radius of each concentric collar being equal to the maximum radius of the eccentric collar on one side and the minimum radius of the eccentric collar on the other side, the minimum radius of the smallest eccentric collar being equal to that of the radius of the shaft, a concentric gear slidably mounted on the driven shaft, one of the two shafts connected by the yoke being movable toward and away from the other shaft in order to bring the gear of the driven shaft successively into mesh with all of the gears of the counter shaft.

11. In means for transmitting motion, the combination of a driving shaft, a driven shaft, an interposed counter shaft, a constant speed-gearing connection between the driving and counter shafts, a changeable speed-gearing connection between the counter and driven shafts, including a number of concentric and eccentric gears mounted on the counter shaft, the eccentric gears being interposed between the concentric gears, the maximum radius of any eccentric gear being equal to the radius of the larger adjacent concentric gear, while the minimum radius of any eccentric gear is equal to the radius of the smaller adjacent concentric gear, a concentric gear mounted on the driven shaft, a yoke connecting the driving and driven shafts, the yoke and gear being mounted to slide in unison on the driven shaft, whereby the gear on the last named shaft is adapted to be brought into mesh successively with all the gears of the counter shaft, the counter shaft also having eccentric and concentric collars of varying diameter, and alternately arranged, the yoke being arranged to successively engage the said collars simultaneously with the successive engagement of the gear on the driven shaft with the gears of the counter shaft, the engagement of the yoke, however, with the said collars being in the reverse order.

12. The combination of a driving shaft, a driven shaft, an interposed counter shaft, a constant speed-gearing connection between the driving and counter shafts, and a changeable speed-gearing connection between the counter and driven shafts, one of the last named shafts being adapted to move toward and away from the other, the said speed-gearing connection comprising a master concentric gear fast on the counter shaft, a concentric gear slidably mounted on the driven shaft, and having its cogged periphery of less width than that of the master gear with which it meshes, there being a number of other concentric gears of varying diameter, and eccentric gears interposed between the concentric gears, each eccentric gear having its maximum radius equal to the radius of the larger adjacent concentric gear, and its minimum radius equal to the radius of the smaller adjacent concentric gear, there being a number of eccentric and concentric collars mounted on the counter shaft, the larger concentric collar being adjacent the master gear, the radius of the largest concentric collar being equal to the maximum radius of the adjacent eccentric collar, while the minimum radius of the largest eccentric collar is equal to the radius of the smaller adjacent concentric collar, the smallest eccentric collar having its maximum radius equal to the radius of the adjacent concentric collar, while its minimum radius is equal to that of the counter shaft, a yoke slidable on the driven shaft with the gear of the said shaft, the said yoke connecting the driven and counter shafts and successively engaging the eccentric and concentric collars as the gear on the driven shaft successively engages the gears on the counter shaft, substantially as described.

In testimony whereof I affix my signature in presence of two witnesses.

HARRY BEAUREGARD ROSS.

Witnesses:
VIRGINIA I. DAVIS,
ELIZABETH BOWEN.